(12) United States Patent
Morley et al.

(10) Patent No.: US 12,112,651 B2
(45) Date of Patent: Oct. 8, 2024

(54) CURRICULUM ARCHITECTURE TOOL

(71) Applicant: Western Governors University, Salt Lake City, UT (US)

(72) Inventors: Jon Morley, Draper, UT (US); Mike Hassett, Taylorsville, UT (US); Adel Lelo, Salt Lake City, UT (US); Jerry Damon Jasperson, Heber City, UT (US); Timothy Andrus, Lehi, UT (US); Brandon Karratti, Salt Lake City, UT (US)

(73) Assignee: Western Governors University, Salt Lake City, UT (US)

( * ) Notice: Subject to any disclaimer, the term of this patent is extended or adjusted under 35 U.S.C. 154(b) by 0 days.

(21) Appl. No.: 17/721,219

(22) Filed: Apr. 14, 2022

(65) Prior Publication Data

US 2022/0335848 A1    Oct. 20, 2022

Related U.S. Application Data

(60) Provisional application No. 63/174,881, filed on Apr. 14, 2021.

(51) Int. Cl.
| | | |
|---|---|---|
| *G09B 5/06* | (2006.01) | |
| *G09B 5/02* | (2006.01) | |
| *G09B 7/00* | (2006.01) | |

(52) U.S. Cl.
CPC .............. *G09B 5/065* (2013.01); *G09B 5/02* (2013.01); *G09B 7/00* (2013.01)

(58) Field of Classification Search
CPC .............. G09B 5/02; G09B 5/065; G09B 7/00
See application file for complete search history.

(56) References Cited

U.S. PATENT DOCUMENTS

| | | | | |
|---|---|---|---|---|
| 10,373,510 | B2 * | 8/2019 | Nguyen | G09B 5/06 |
| 2005/0033584 | A1 * | 2/2005 | Hejna | G06F 3/04847 |
| | | | | 704/E15.045 |
| 2007/0202481 | A1 * | 8/2007 | Smith Lewis | G09B 19/06 |
| | | | | 434/323 |
| 2008/0166693 | A1 * | 7/2008 | Gifford | G09B 7/00 |
| | | | | 434/322 |
| 2010/0046911 | A1 * | 2/2010 | Yachi | H04N 5/783 |
| | | | | 386/343 |
| 2011/0039246 | A1 * | 2/2011 | Packard | G09B 7/06 |
| | | | | 434/362 |
| 2018/0261117 | A1 * | 9/2018 | Levinson | G06F 16/435 |
| 2019/0216392 | A1 * | 7/2019 | Bower | A61B 5/4088 |
| 2021/0049923 | A1 * | 2/2021 | Brinton | G09B 7/00 |

* cited by examiner

*Primary Examiner* — Kang Hu
*Assistant Examiner* — Correll T French
(74) *Attorney, Agent, or Firm* — Workman Nydegger

(57) ABSTRACT

Delivering multimedia content for academic curriculum, over a network, to a user. The method includes a multimedia content delivery system identifying user attributes for the user, where the user is connected to the multimedia content delivery system over a network. The method further includes the multimedia content delivery system identifying attributes of a plurality of multimedia assets. Based on the identified user attributes and the identified attributes of the plurality of multimedia assets, the method includes creating a multimedia offering for delivery to the user. The multimedia offering satisfies a curriculum requirement specific to the user based on the user attributes. The multimedia offering is delivered over the network to the user.

20 Claims, 2 Drawing Sheets

CURRICULUM ARCHITECTURE TOOL

CROSS-REFERENCE TO RELATED APPLICATIONS

This application claims the benefit of and priority to U.S. Provisional Patent Application Ser. No. 63/174,881 filed on Apr. 14, 2021 and entitled "Curriculum Architecture Tool," and which application is expressly incorporated herein by reference in its entirety.

BACKGROUND

Background and Relevant Art

Computers and computing systems affect nearly every aspect of modern living. Computers are generally involved in work, education, recreation, healthcare, transportation, entertainment, household management, etc. Indeed computers are heavily relied upon in current times to provide educational opportunities to individuals.

Individuals seek education for a variety of different purposes. Those purposes can include curiosity at one end of the spectrum to becoming a subject matter expert at another end of the spectrum.

In obtaining educational learning, there is often a desire to ensure the education was completed. Thus, for example schools offer diplomas to signify completion of coursework associated with particular degree programs. Other teaching entities may offer credentials (such as certifications, certificates, degrees, or other documentation) to indicate completion of coursework and/or to indicate certain qualifications.

However, for the learner, it can often be difficult to ensure appropriate qualifications and coursework are completed so the appropriate credentials are granted. For example, consider a case where a learner intends to seek employment and/or potential employment as a teacher in a number of different jurisdictions. Each of the different jurisdictions has different requirements to obtain a teaching certificate. However, the learner cannot anticipate exactly the jurisdiction they will be operating and thus it may be difficult for the learner to ensure they have completed all requirements to obtain employment in the various jurisdictions where the learner intends to seek employment.

Note in modern educational systems, large amounts of educational material can be accessed at the convenience of the learner. In particular, the learner can access appropriate multimedia information including text, audio, video, images, drawings and diagrams, etc., which facilitate the learning experience for the learner. This information is accesses over vast networks, including large on-line repositories of materials. The challenges discussed above are compounded in this environment as the learner is faced with massive amounts of information that is able to be learned while needing or desiring only a subset of that information.

Thus, it would be useful to have a system where learners can easily participate in learning opportunities where appropriate multimedia content is provided automatically to the learner to facilitate the learning experience.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of delivering multimedia content to a user. The method includes identifying user attributes for the user. The method further includes identifying attributes of a plurality of multimedia assets. Based on the identified user attributes and the identified attributes of the plurality of multimedia assets, the method includes creating a multimedia offering for delivery to the user. The multimedia offer satisfies a curriculum requirement specific to the user based on the user attributes. The method further includes delivering the multimedia offering to the user over a network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are generally directed to delivering multimedia content to users, and in particular delivering content to users in a fashion that allows certain learning objectives to be accomplished. This can be accomplished by identifying certain user attributes such as user goals, desired skills, desired competencies, desired learning experiences, desired credentials (e.g., degrees, certifications, etc.), previous education, etc. Further, attributes of multimedia assets are identified. For example, content of assets, asset membership in a particular coursework curriculum, membership in a particular pathway, ability of asset to be used to satisfy certain credential requirements, the asset being a token of a certain credential, etc., can be identified. Using the identified user attributes and the identified multimedia asset attributes, a multimedia offering is created and delivered to the user. For example, certain applicable business rules are evaluated to identify multimedia offerings that need to be delivered to a learner based on the learner's attributes. Additional details are now illustrated.

Figure 1:
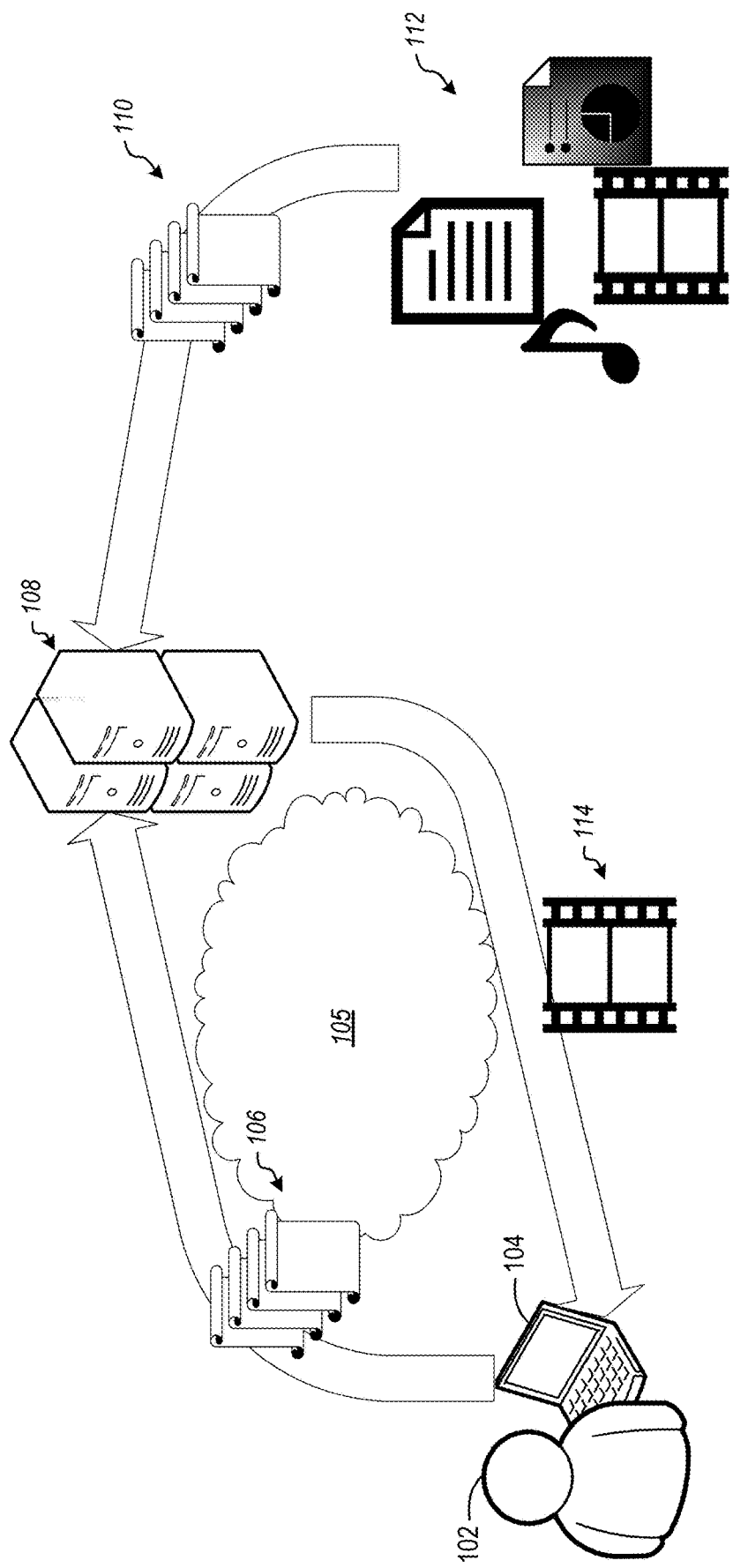
FIG. 1 illustrates a system for delivering multimedia content to a user based on user attributes.

Referring now to FIG. 1 an example is illustrated. In the example illustrated in FIG. 1, a user 102 is illustrated as an individual learner or student that desires to obtain educational experiences and/or credentials. Typically, the user will interact with a personal computing system 104 which comprises computing hardware and software configured to present the experiences and/or credentials as multimedia content to the user 102. Such multimedia content may include audio content, video content, slideshow presentation content, text content, digital credentials, etc. In some embodiments, the multimedia content may be interactive content. For example, in some embodiments, the multimedia content may be a digitally provided assessment used to measure competency demonstrated by a user, such that information (such as questions) is presented to the user and the user responds with some type of response. The user response can be used to determine a user's competency. The user's competency (or even an assessment attempt when certain competencies are not fully demonstrated) then becomes a user attribute that can be used to determine if further multimedia content is to be provided to the user.

In the example illustrated in FIG. 1, attributes 106 for the user 102 are identified. Such a user attributes 106 may include for example an indication that the user 102 has a goal for obtaining one or more credentials. In some embodiments, the goal may be an indication that the user has a goal to obtain credentials in a plurality of jurisdictions. For example, the user want may wish to obtain teaching certificates for a plurality of different cities and/or states to allow the user 102 to perform instructional activities within those jurisdictional requirements. Alternatively or additionally, the user attributes 106 may include an indication that the user 102 desires to obtain certain skills, competencies, learning experiences, assessments, or badges. Alternatively or additionally, the user attributes 106 may include indications that the user 102 has already obtained one or more of skills, competencies, learning experiences, assessments, or badges. Alternatively or additionally, the user attributes 106 may include indications that the user 102 has attempted to obtain, or has partially obtained one or more of skills, competencies, learning experiences, assessments, or badges.

As illustrated, the user attributes 106 can be provided to a multimedia content delivery system 108 over a network 105. The multimedia content delivery system 108 further receives attributes 110 regarding multimedia assets 112. The attributes 110 regarding the multimedia assets 112 may include information identifying characteristics of the multimedia assets 112 including for example, topics covered by the multimedia assets 112, membership of the multimedia assets in one or more curriculums, specific details about which portions of a curriculum a multimedia asset satisfies, etc.

The multimedia content delivery system 108 uses the user attributes 106 and the asset attributes 110 to then identify multimedia assets that should be provided, over the network 105, to the user 102 through the user's personal computing system 104. For example, FIG. 1 illustrates a multimedia offering 114 that includes one or more multimedia assets which are then delivered to the user 102 through the user's personal computing system 104. Thus, for example, if the user 102 has a goal to obtain a certain credential as indicated in the user attributes 106, the multimedia content delivery system 108 can identify multimedia assets from among the multimedia assets 112 that would help to satisfy the user's goal to obtain the certain credential. The selection by the multimedia content delivery system 108 may be based on several factors including required learning by the user 102 to obtain the certain credential along with learning that has previously already been accomplished by the user 102. Further, the multimedia content delivery system 108 may select the multimedia offering 114 in an ordered fashion such that ordered learning takes place for the user 102.

Note that while in the example illustrated in FIG. 1 multimedia offering 114 is shown as being delivered directly from the multimedia content delivery system 108, alternative delivery paths may be implemented. For example, in some embodiments, the multimedia content delivery system 108 may identify the user attributes 106 and the attributes 110 for the plurality of multimedia assets to identify the multimedia offering 114, but then may direct a third computing system to actually deliver the multimedia offering 114 to the user 102 through the personal computing system 104.

In particular, it should be noted that many learning systems are now implemented with computer network-based components. Presently, there are many universities that are essentially all "on-line" where computer networks and computing systems are relied on to deliver learning materials. Indeed, in recent times, even traditionally brick-and-mortar location-based institutions have begun to deliver large portions of their content using computer networks and are indeed dependent on these physical computer networks to deliver learning materials.

Further, embodiments illustrated herein, if analogized to traditional brick-and-mortar learning systems are akin to a user entering a generic building or classroom, and based on the user's attributes, the user is suddenly and completely transported outside of the generic building or classroom and relocated to a separate physical venue associated with the particular curriculum needed by the user. For example, a user could be transported, through the miracle of cyberspace, from a generic classroom to the college of engineering, the college of education, the college of social sciences, or virtually any other appropriate college. Thus, through the miracle of cyberspace, curriculum elements are identified for the user, and the user is transported to the specific college where those curriculum elements can be consumed by the user.

The invention illustrated herein includes multimedia content selection at a system (e.g., content delivery system 108) that is remote from the user's personal computing system 104. Thus, customizable multimedia selection features specific to each end user provides the benefits of both the benefits of a multimedia selection feature at a local computer and on a remote content delivery server.

Note further that while FIG. 1 illustrates the user attributes 106 being sent to the multimedia content delivery system 108, in some embodiments, the multimedia content delivery system 108 may store the user attributes 106 at the multimedia content delivery system 108. The multimedia content delivery system 108 may further update the user attributes 106 as the user attributes change based on user input in indicating new desired learning or credentials by the user 102, additional learning or experiences having been undertaken by the user 102, or for other reasons where the user attributes 106 change. In these cases, the user 102 and simply log into the multimedia content delivery system 108 to provide indications of additional desired credentials, learning experiences, etc. or other information that can be used to update the user attributes 106.

Similarly, while the multimedia attributes 110 are shown as being provided to the multimedia content delivery system 108, those attributes 110 may have been previously stored at the multimedia content delivery system 108 there based on having been created and stored directly on the multimedia content delivery system 108, or having been provided by content servers or other computing systems able to provide the attributes 110.

Thus, in general, the multimedia content delivery system 108 can identify user attributes 106 for the user 102 in whatever fashion is needed including by identification of existing status information at the multimedia content delivery system 108 or by receiving additional information from other sources including from the user 102 from other systems. Multimedia content delivery system 108 further identifies attributes 110 of a plurality of multimedia assets 112 in whatever fashion is appropriate whether by referencing attributes stored at the multimedia content delivery system 108 or by accessing attributes 110 at other multimedia content server systems or other systems. Further, based on the identified user attributes 106 in the identified attributes 110 of the plurality of multimedia assets, the multimedia offering 114 is created for delivery to the user 102. Creation of the multimedia offering 114 may be performed in whatever fashion is appropriate including creating the multimedia content multimedia offering 114 directly at the multimedia content delivery system 108 or by directing other systems to deliver the multimedia offering, or at least portions of the multimedia offering 114, to the user 102 through the personal computing system 104 of the user 102.

Illustrating now one particular example, one embodiment illustrated herein is referred to as the Curriculum Architecture Tool (CAT). The CAT makes it possible to align learning content and assessment content to skills and competencies, make course information available to other systems, provide the structure for stackable achievements, and provision the elements needed to serve up dynamically personalized content to students.

CAT creates the link between skills, competencies, learning experiences, assessments, and badges. It also enables stackable achievements, pathways, modular content, and dynamic building of courses using that modular content.

It includes the development of new learning and assessment components. Versioning is handled under a set of requirements. Rules for automatically incrementing versions are based on specific changes made to components.

Embodiments may include one or more of the following features:
1. Offer industry-aligned learning and assessment based on dynamic skills maps.
2. Provide a learner-owned record of achievements, including skills, competencies, micro-credentials, and degrees.
3. Offer flexible, stackable achievements.
4. Offer distributed assessments.
5. Improve efficiency and reduce cost by managing learning content to allow reuse.
6. Improve time to market and development efficiency by optimizing change management.
7. Offer easy ways to move students into newest and best versions.
8. Automate delivering personalized content and pathways to students.

The following illustrates features of some embodiments of the CAT.
  Picklist values allow additions.
  Components (skills, competencies, courses, micro credentials, degrees, etc.) are structured so additional metadata can be added to them at any time as new metadata is needed for other systems.
  The system allows users to see who created and modified elements and when. Requirements for how that data is displayed to users is established as part of the interface requirements.
  The database structure ensures that student progress and achievements can be represented in industry-standard formats, such as Open Badges 2.1, CTDL, CTDL-ASN, CLR, CASE, etc.
  When creating new product components within the CAT, there is an option to publish those components such that they can be easily referenced via common standards and publicly-reviewed from within external systems.

The follow includes various working definitions for various elements of the CAT, as well as business rules applied to identify multimedia content for delivery to a user, and associations between different elements. Note that following is not an exhaustive list, nor are all items required to be implemented in various embodiments of the invention. Rather, the following illustrate examples of multimedia content that can be provided, structures or containers of multimedia content, entities associated with multimedia content, elements for determining what multimedia content should be provided to specific users, and the like. Further, it should be appreciated the business rules and associations are only for example purposes for example embodiments. Different business rules and/or associations may be implemented for similar concepts in alternative embodiments.

Agent/Owner: Organization or person who plays an important role in the development and ongoing maintenance of a product component, pathway, or pathway set.
Applicable Business Rules
  Agent/Owner can include any organizations or individuals.
  Agent/Owner should include a point of contact within an organization, as applicable
Potential Associations
  Product component
  Pathway
  Pathway set
Notes
  Agent/Owner may not be needed if multiple offerings are not included within the CAT.
Assessment: A tool used to measure competency or aspects of competency demonstrated by learners.
Applicable Business Rules
  Assessments can be formal (i.e., summative in purpose) or informal (i.e., formative in purpose).
  Formal assessments are used to validate learner competency.
  Informal assessments are used to measure or build comprehension, skill, ability, or other aspects of understanding necessary for learners to develop and demonstrate competency.
  Assessments can be comprised of machine-scored or human-scored activities.
  Assessments can be inline or standalone. Inline assessments are tightly coupled and delivered within curricular content. Standalone assessments are not delivered within curricular content.
  Assessments can be developed in-house or by a third-party vendor.
  Assessments can be delivered by native or third-party platforms.
  Formal assessments can be proctored by in-house or third-party proctoring services.
  Assessments can be assigned a human-readable, coded value for easier reference.

Assessments can be named for easier reference within curricular and planning-related content (e.g., task cards, reports, etc.).

Formal assessments are made available to students via pathways associated with approved offerings.

Formal assessments related to courses are added to a pathway when the related course is added to a pathway.

Potential Associations
   Competency
   Course
   Certification
   Micro-credential
   Degree
   Other product component, as appropriate
   Product relation
   Pathway (this is a dependency for formal assessments)
   Component condition
   Assessment form (machine-scored)
   Assessment task (human-scored)
   Agent/Owner Assessment Attempt: A stored session or sessions of a learner's interactions with an assessment.

Applicable Business Rules
   Partially-completed activities count as an attempt.
   For informal assessments, activities can be completed over multiple sessions.
   For formal assessments not marked for distribution requirements exceptions, attempts should be evenly distributed across available assessment forms.
   Attempt limits may be set for formal assessments.

Potential Associations
   Assessment form ID
   Student ID
   Activity sessions which include student Responses to previously-submitted/completed items within an assessment activity Assessment Form: A collection of items representing an instance of an assessment. In some embodiments, assessment forms are realized as activities.

Applicable Business Rules
   Assessment forms are created for machine-scored assessment delivery.
   Assessment forms associated with the same assessment are psychometrically equivalent.
   Assessment forms are comprised of items.
   When more than one assessment form exists for a formal assessment and the forms are not marked for exception from balancing, attempts across all learners should be balanced in such a way that distribution of forms is as even as possible across attempts.
   When more than one assessment form exists for a formal assessment and the forms are not marked for exception from balancing, a learner's subsequent attempts should alternate between available forms.
   Assessment forms have a cut score used to determine pass/fail status for the learner's attempt.
   Assessments have a readable, alpha-numeric code assigned for easy reference. In one embodiment, the code is in the format AAA-0000 and it does not imply any encoded significance. Assessment codes should be unique across all assessments.
   Assessment forms may be dynamically created based on predetermined psychometric criteria.
   In some embodiments, assessment forms are referred to as activities.

Potential Associations
   Assessment
   Items

Assessment Task: A description of requirements and instructions for student work related to human-scored assessments.

Applicable Business Rules
   TBD

Potential Associations
   Rubric
   Evaluation
   Evidence Statement

Certification: A time-limited, renewable non-degree credential awarded by an institution or authoritative body in recognition of the completion of a curriculum that demonstrates the designated knowledge, skills, and abilities to perform a specific job or jobs.

Applicable Business Rules
   Certifications are typically awarded based on courses, assessments, other certificates, or other product components, as appropriate, but represent a more limited set of curricula than is available within a degree-level product.
   Certifications are made available to students when designated as destination components of pathways and associated with an approved offering.
   Certifications can be stacked as part of the completion requirements for larger product components and made available to students via pathways associated with approved offerings.
   Certificates can be offered at the graduate and undergraduate level.
   When not offered for traditional credit, certificates do not qualify students for enrollment status.

Potential Associations
   Assessment
   Course
   Certification
   Microcredential
   Degree
   Other product components, as appropriate
   Component condition
   Pathway
   Agent/Owner Certificate (Title IV Ineligible): A credential that does not qualify for federal financial aid assistance but that is issued by an institution in recognition of the completion of curricula that usually represents requisite mastery of the knowledge and skills of an occupation, profession, or academic program.

Applicable Business Rules
   Title IV ineligible certificates can be made available to learners when they are designated as the destination components of pathways and associated with approved offerings.
   Title IV ineligible certificates may be offered within the context of credit-bearing or non-credit-bearing components.
   Title IV ineligible certificates may vary in size, but when they are included within a pathway and intended to be credit-bearing, they are associated offerings that are less than one year in duration (less than 24 credit units, in some embodiments).
   Title IV ineligible certificates that are included within a pathway and not intended to be credit bearing may be associated with offerings that are greater than one year in duration (equivalent of 24 credit units, in some embodiments) but are smaller than the equivalent level of academic engagement typically required to complete a degree.

Title IV ineligible certificates should always have value in the market, depicted via skill denomination.

Potential Associations
Competency
Assessment
Course
Micro-credential
Degree
Other product component, as appropriate
Component condition
Pathway
Agent/Owner Certificate (Title IV Eligible): A credential that qualifies for federal financial aid assistance and is issued by an institution in recognition of the completion of curricula that usually represents a more limited domain of knowledge than established degrees. Title IV eligible certificate programs are at least one academic year in duration (24 CUs, in some embodiments) and may include multiple micro-credentials.

Applicable Business Rules
Title IV eligible certificates can be made available to learners when they are designated as the destination components of pathways and associated with approved offerings.
When they are included within a pathway, Title IV eligible certificates are associated with offerings that are greater than one year in duration.
Title IV eligible certificates may vary in size so long as they represent more than 24 credit units of academic credit, in some embodiments, but are smaller than the amount of credit generally required to complete a degree.
Title IV eligible certificates may be comprised of multiple smaller product components (e.g., nano-credentials, micro-credentials, etc.).
Title IV eligible certificates are credit bearing.

Potential Associations
Competency
Assessment
Course
Micro-credential
Degree
Other product component, as appropriate
Component condition
Pathway
Agent/Owner Competency: A skill or collection of skills that an individual must know and be able to do at a determined level to perform a specific task, job role, or function.

Applicable Business Rules
A competency is validated via one or more assessments.
A competency is the lowest level at which we might award an achievement.
Instructional experiences associated with competencies are generally delivered within a course and made available to learners via offerings.
Competency names are comprised of a verb and three to five additional words.
Competencies are described by statements that include a subject, verb, and predicate and are not longer than 300 characters, in some embodiments.
When associated to an assessment, competencies can be weighted in relation to other competencies associated to the same assessment.
Successful completion of an associated competency validation assessment can result in the award of a competency achievement.
Competencies and their weighting may be aligned with one or more standards when associated to assessments.

Potential Associations
Assessment
Evidence Statement
Content Block
Standard
Skill Component Condition: A description of what must be done to complete a Product Component, or part thereof.

Applicable Business Rules
Within a pathway, component conditions can describe sequence-based relationships between product components, such as prerequisite and co-requisite conditions.
Within a pathway, component conditions can describe alternate relationships between product components, such as elective conditions.

Potential Associations
Product component
Pathway

Content Block: Components that deliver content to learners.

Applicable Business Rules
Content blocks in CAT reflect configuration and organization of content, not actual produced content.
Content blocks can be developed in-house or by third parties.
Content blocks may be configured according to predetermined style templates.
Content blocks may include informal assessment activities.

Potential Associations
Course
Other product components, as appropriate
Content Outline Level
Evidence Statement
Topic
Learning Resource
Competency (at least for section-level content blocks)

Content Outline Level: The level at which a specific block should be included within the overall content structure when it is associated with a product component.

Applicable Business Rules
Content outline levels represent sections, lessons, units, and microunits.

Potential Associations
Course
Other product components, as appropriate
Competency
Learning Objective
Topic
Evidence Statement
Content Block Course: A collection of one or more educational activities that aims to develop a prescribed set of one or more competencies stacked together in pursuit of a course achievement.

Applicable Business Rules
When offered within the context of credit-bearing, academic completion, courses comprise a collection of one or more content blocks that provide the instructional experiences designed to prepare learners for competency validation via formal assessment.

When offered within the context of non-credit-bearing, non-academic completion, courses comprise a collection of one or more content blocks that provide the instructional experiences designed to develop skills in learners and impart competency information.

Successful completion of a course and related, required assessments, can result in the award of an achievement.

Courses are made available to students via pathways associated with approved offerings.

Courses marked as standalone can be designated as the destination components of pathways and made available to students when associated with approved offerings.

Courses not marked as standalone can be combined with other courses and sequenced within pathways that are made available to students when associated with approved offerings.

Within the context of credit-bearing, academic completion, when a course is added to a pathway its related formal assessments is also added to the pathway.

Potential Associations
Assessment
Certification
Micro-credential
Degree
Other product components, as appropriate
Product relation
Content block
Component. condition
Pathway
Agent/Owner Degree: A credential conferred by a college, university, or other postsecondary institution as official recognition for the successful completion of a program of studies.

Applicable Business Rules
Degrees typically include courses, assessments (when appropriate), certificates, micro-credentials, etc.
Degrees can be designated as the destination components of one or more pathways.
Degrees are made available to students when designated as the destination component of pathways and associated with approved offerings.

Potential Associations
Assessment
Course
Certification
Micro-credential
Other product components, as appropriate
Product relation
Component condition
Pathway
Agent/Owner Destination Component: The final product component within a pathway representing the completion of a set of instructional experiences, assessments, and/or other curricular and non-curricular requirements.

Applicable Business Rules
Completion of a destination component may result in the award of an achievement, as determined by Academic Records and Credentials.

Potential Associations
Product component
Pathway

Evaluation: An evaluation is an official communication of a student's results based on the submission of an artifact in response to a rubric/human-scored assessment task.

Applicable Business Rules
Evaluations can be completed on a variety of artifacts (e.g., document, presentation, website, software program, etc.).
Evaluations are conducted in accordance with a predetermined rubric.
Evaluations may be incremental or final; students may be able to submit an assessment task artifact multiple times before it is considered final.

Potential Associations
Rubric
Assessment task
Submitted artifact in response to an assessment task Evidence Statement: A description of the ways in which a learner demonstrates aspects of competency for the purpose of assessment and validation.

Applicable Business Rules
Evidence statements can be weighted by percentage in comparison to other evidence statements when associated with the same competency.
Evidence statement weights may be based on criteria specified by the issuing institution or by one or more standards bodies.
Evidence statements may be assigned a difficulty level when associated with a competency. Difficulty levels may be based on criteria specified by the issuing institution or by one or more standards bodies.
Evidence statements can be associated with one or more items as a way of providing greater context to competency associations.
Evidence statements can be associated with content blocks as a means of providing additional context to the association of a competency and its supporting curricular content.

Potential Associations
Competency
Content block
Item
Standards Body

Feature: Interactive components that can be attached to items to help students during the completion of a specific item or an entire assessment attempt.

Applicable Business Rules
Feature types include calculators, rulers, text passages, protractors, embeddable audio and video players, or other custom-developed components needed for student completion of the assessment attempt.

Potential Associations
Custom-developed components may have associations to specific content blocks.
Item
Assessment form (activity)

Item: A container for questions, response options, and associated features, including a layout and metadata regarding the item's evaluation criteria, scoring, and distractor rationale (feedback).

Applicable Business Rules
Item naming follows a predetermined format: AAA-BBB-0000 (three alpha-numeric characters, a dash, three more alpha-numeric characters, a dash, and four numbers). The naming convention is not encoded with special significance, it is merely a way to provide a more human-readable code when referring to items.
Items can be tagged to evidence statements, when applicable.
Items can be tagged to skills, when applicable.

Potential Associations
Assessment form

Feature

Assessment attempt (Session)

Learning Objective: A brief statement of what a learner should be able to do after completing one or more instructional experiences.

Applicable Business Rules

Learning objectives are ascribed a coded value for easy reference.

Potential Associations

Content Block

Skill

Learning Resource: A resource learners can access to support achievement and demonstration of a competency.

Applicable Business Rules

Learning resources can be created, hosted, and owned by a first party or a third party.

Potential Associations

Content block

Micro-credential: A form of credential endorsed by the issuing institution to verify, validate, and attest that specific competencies have been demonstrated.

Applicable Business Rules

Micro-credentials are comprised of sequences and achievements that usually align with employer and industry need.

Micro-credentials may stand alone or be stacked into a larger credential.

A micro-credential can be designated as the destination of one or more pathways.

Micro-credentials are made available to students via pathways associated with approved offerings.

Micro-credentials typically include courses, courses, assessments (when appropriate), or other smaller product components.

Potential Associations

Assessment

Course

Certification

Micro-credential

Degree

Other product components, as applicable

Product relation

Component condition

Pathway

Agent/Owner

Offering: An offering is a set of rules, attributes, and conditions that define the availability of a product component's pathway for a specific group of learners.

Applicable Business Rules

Offerings can be time-bound.

Offerings can be customized to the needs of sponsors.

Offerings can be configured to represent product components that are made available for academic and non-academic completion.

Offerings can be customized to provide varying levels of academic support to students.

Potential Associations

Pathway

Other associations to be determined by the offering management system.

Pathway: A plan composed of a structured set of product components defining points along a route to fulfillment of an academic goal or objective.

Applicable Business Rules

Pathways define routes to destination-designated product components made available to learners via offerings.

Pathways can either represent or be combined into pathway sets.

Pathways can include component conditions which much be satisfied for learners to progress toward their destination.

A pathway includes at least one product component.

Potential Associations

One or more product components (assessment, course, certificate, micro-credential, degree, etc.)

Offering

Component condition

Pathway set

Agent/Owner

Pathway Set: A group of multiple pathways leading to one or more destination components.

Applicable Business Rules

Pathway sets include more than one pathway.

Potential Associations

Pathway

Agent/Owner

Product Component: Any set of instructional materials or testing tools that can be offered as a product to learners and that serve as a defined point (including the destination) within a pathway, including but not limited to a course, degree, micro-credential, certificate, or assessment.

Applicable Business Rules

Product components are made available to students via pathways associated with approved offerings.

When included within a pathway, product components may be stacked as part of the completion requirements for larger product components.

Product components that are designated as standalone (e.g., courses, degrees, certificates, micro-credentials, etc., may be designated as a destination component (final component) within a pathway and made available to learners when associated with approved offerings.

A product component's relationships to other product components may be contextualized by conditions (component conditions).

Non-assessment product components can be associated with achievements.

Potential Associations

Assessment

Course

Certification

Micro-credential

Degree

Other product components, as appropriate

Product relation

Competency

Content Outline Level

Assessment form (Assessment components only)

Component condition

Pathway

Agent/Owner

Product Relation: Contextualized relationship between two product components or between a product component and an external qualifier.

Applicable Business Rules

Product components can be related to one another via product relations to establish stacked credentials.

Product components can be related to first party or third-party standards bodies for contextual understanding.

Potential Associations

Assessment

Course

Certification
Microcredential
Degree
Other product components, as appropriate
External entity
Rubric: Task requirements that communicate expected levels of performance on established criteria used by human or machine evaluators to score assessment artifacts submitted by students.
Applicable Business Rules
  Rubrics are used for evaluating human-scored assessment submissions.
  Rubrics are student-facing.
  Rubrics typically include rows that define the criteria used to assess a student submission and columns that define the level of performance for each criterion.
Potential Associations
  Assessment task
  Evaluation
Topic: Content-specific, thematic headers presented to the learner to provide focus for a set of instructional experiences.
Applicable Business Rules
  Topics are generally short and should be limited to about eight words.
Potential Associations
  Content outline level
  Skill The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
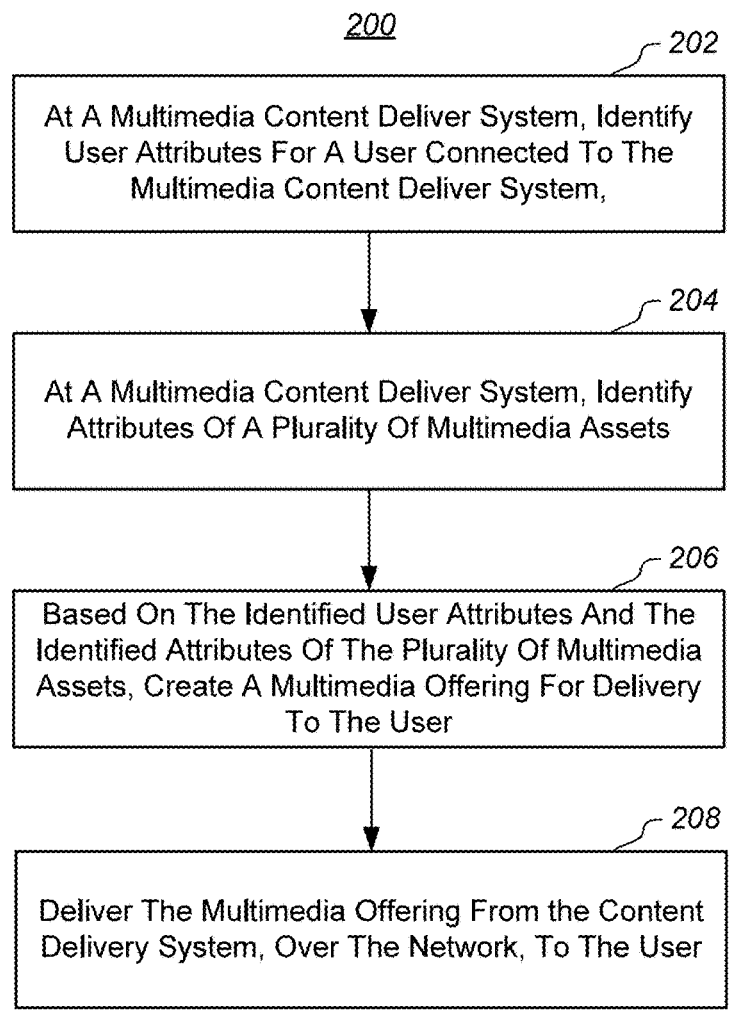
FIG. 2 illustrates a method of delivering multimedia content to a user.

Referring now to FIG. 2, a method 200 is illustrated. The method includes acts for delivering multimedia content to a user. The method 200 includes, at a multimedia content delivery system, identifying user attributes for a user connected to the multimedia content delivery system over a network (act 202).

The method 200 further includes the multimedia content delivery system identifying attributes of a plurality of multimedia assets (act 204).

Based on the identified user attributes and the identified attributes of the plurality of multimedia assets, the method 200 includes automatically creating a multimedia offering for delivery to the user (act 206). The multimedia offering satisfies a curriculum requirement specific to the user based on the user attributes.

The method 200 further includes delivering the multimedia offering from the content delivery system, over the network, to the user (act 208).

The method 200 may be practiced where the multimedia offering comprises a single session class.

The method 200 may be practiced where the multimedia offering comprises a multi-session course. In some such embodiments, user attributes indicate a goal for the user obtaining one or more certifications for one or more particular jurisdictions and the multimedia offering comprises instructional material and testing material, that if successfully completed by the user, can be used by the user to obtain the one or more certifications.

The method 200 may be practiced where the multimedia offering comprises a multi-course degree program.

The method 200 may be practiced where the multimedia offering comprises video having portions of the video selected and/or emphasized based on the user attributes. For example, portions of the video that are less relevant based on the user attributes can be eliminated from the video, played at a faster speed than other portions of the video, etc. while other more relevant portions are included, played at a normal or slow speed, have volume automatically increased, or are otherwise emphasized.

The method 200 may be practiced where the multimedia offering comprises an e-book having portions of the e-book selected and/or emphasized based on the user attributes. For example, based on user attributes, portions of an e-book can be added or removed from the e-book, provided in certain emphasizing or de-emphasizing fonts (e.g., bold vs. normal text), or otherwise emphasized or de-emphasized.

The method 200 may be practiced where the user attributes comprise an indication that the user desires to obtain one or more of skills, competencies, learning experiences, assessments, or badges.

The method 200 may be practiced where the user attributes comprise an indication that the user has previously obtained one or more of skills, competencies, learning experiences, assessments, or badges.

The method 200 may be practiced where the multimedia offering comprises an assessment.

The method 200 may further include delivering the multimedia offering to the user. In some such embodiments, as a result of delivering the multimedia offering to the user, the method 200 may further include providing a badge, credential, certification, or degree to the user.

In some embodiments, delivering the multimedia offering to the user includes delivering the multimedia content based on user attributes. For example, speed of delivery, speed of certain portions, emphasis on certain portions, combination with auditory, visual, and/or haptic elements to fit learning style, etc. may be selected based on user attributes.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of delivering multimedia content to a user, the method comprising:
    at a multimedia content delivery system, identifying user attributes for the user connected to the multimedia content delivery system over a network;
    at the multimedia content delivery system, identifying attributes of a plurality of multimedia assets;
    based on the identified user attributes and the identified attributes of the plurality of multimedia assets, using applicable business rules, automatically creating a multimedia offering, including selecting a portion of the multimedia assets, while excluding other portions of the multimedia assets, for delivery to the user that satisfies a requirement specific to the user based on the user attributes, wherein the multimedia offering comprises a video having portions of the video automatically emphasized or de-emphasized based on relevance to the user attributes, the user attributes including a particular certification to be obtained wherein emphasizing comprises automatically playing the portions of the video at a slower speed than other portions of the video and de-emphasizing comprises automatically playing the portions of the video at a faster speed than other portions of the video, wherein portions are played at a slower speed as a result of determining that the portions played at a slower speed are more relevant to the particular certification to be obtained than portions played at a higher speed; and
    delivering the multimedia offering from the content delivery system, over the network, to the user.

2. The method of claim 1, wherein the multimedia offering comprises a single session class.

3. The method of claim 1, wherein the multimedia offering comprises a multi-session course.

4. The method of claim 3, wherein user attributes indicate a goal for the user obtaining one or more certifications for one or more particular jurisdictions and wherein the multimedia offering comprises instructional material and testing material, that if successfully completed by the user, can be used by the user to obtain the one or more certifications.

5. The method of claim 1, wherein the multimedia offering comprises a multi-course degree program.

6. The method of claim 1, wherein the multimedia offering further comprises an e-book having portions of the e-book automatically emphasized based on the user attributes, wherein emphasizing comprises presenting portions of the e-book in bold text based on the user attributes while presenting other portions of the e-book in un-bolded text.

7. The method of claim 1, wherein the user attributes comprise an indication that the user desires to obtain one or more of skills, competencies, learning experiences, assessments, or badges.

8. The method of claim 1, wherein the user attributes comprise an indication that the user has previously obtained one or more of skills, competencies, learning experiences, assessments, or badges.

9. The method of claim 1, wherein the multimedia offering comprises an assessment.

10. The method of claim 1, further comprising, as a result of delivering the multimedia offering to the user, providing a badge, credential, certification, or degree to the user.

11. A computer system for delivering multimedia content for to a user, the system comprising:
one or more processors; and
one or more computer-readable media having stored thereon instructions that are executable by the one or more processors to configure the computer system to deliver multimedia content to the user, including instructions that are executable to configure the computer system to perform at least the following:
identifying user attributes for the user connected to the multimedia content delivery system over a network;
identifying attributes of a plurality of multimedia assets;
based on the identified user attributes and the identified attributes of the plurality of multimedia assets, using applicable business rules, automatically creating a multimedia offering, including selecting a portion of the multimedia assets, while excluding other portions of the multimedia assets, for delivery to the user that satisfies a requirement specific to the user based on the user attributes wherein the multimedia offering comprises a video having portions of the video automatically emphasized or de-emphasized based on relevance to the user attributes, the user attributes including a particular certification to be obtained wherein emphasizing comprises automatically playing the portions of the video at a slower speed than other portions of the video and de-emphasizing comprises automatically playing the portions of the video at a faster speed than other portions of the video, wherein portions are played at a slower speed as a result of determining that the portions played at a slower speed are more relevant to the particular certification to be obtained than portions played at a higher speed; and
delivering the multimedia offering from the content delivery system, over the network, to the user.

12. The computer system of claim 11, wherein user attributes indicate a goal for the user obtaining one or more certifications for one or more particular jurisdictions and wherein the multimedia offering comprises instructional material and testing material, that if successfully completed by the user, can be used by the user to obtain the one or more certifications.

13. The computer system of claim 11, wherein the multimedia offering comprises a multi-course degree program.

14. The computer system of claim 11, wherein the multimedia offering further comprises an e book having portions of the e book emphasized based on the user attributes.

15. The computer system of claim 11, wherein the user attributes comprise an indication that the user desires to obtain one or more of skills, competencies, learning experiences, assessments, or badges.

16. The computer system of claim 11, wherein the user attributes comprise an indication that the user has previously obtained one or more of skills, competencies, learning experiences, assessments, or badges.

17. The computer system of claim 11, wherein the multimedia offering comprises an assessment.

18. One or more non-transitory computer-readable media having stored thereon instructions that are executable by one or more processors to configure a computer system to deliver multimedia content to a user, including instructions that are executable to configure the computer system to perform at least the following:
at a multimedia content delivery system, identify user attributes for the user connected to the multimedia content delivery system over a network;
at the multimedia content delivery system, identify attributes of a plurality of multimedia assets;
based on the identified user attributes and the identified attributes of the plurality of multimedia assets, using applicable business rules to automatically create a multimedia offering, including selecting a portion of the multimedia assets, while excluding other portions of the multimedia assets, for delivery to the user that satisfies a requirement specific to the user based on the user attributes, wherein the multimedia offering comprises a video having portions of the video automatically emphasized based on determining relevance to the user attributes, the user attributes including a particular certification to be obtained wherein emphasizing comprises automatically playing the portions of the video at a slower speed than other portions of the video, wherein portions are played at a slower speed as a result of determining that the portions played at a slower speed are more relevant to the particular certification to be obtained than portions played at a higher speed; and
delivering the multimedia offering from the content delivery system, over the network, to the user.

19. The computer system of claim 11, wherein emphasizing comprises automatically playing the portions of the video at a higher volume than other portions of the video and de-emphasizing comprises automatically playing the portions of the video at a lower volume than other portions of the video.

20. The one or more non-transitory computer-readable media of claim 18, wherein emphasizing comprises automatically playing second portions of the video at a higher volume than other portions of the video and de-emphasizing comprises automatically playing the second portions of the video at a lower volume than other portions of the video.

* * * * *